July 5, 1938.  J. F. BOZEMAN  2,123,036
RELEASABLE FISHING TOOL
Filed Sept. 26, 1936   2 Sheets-Sheet 2

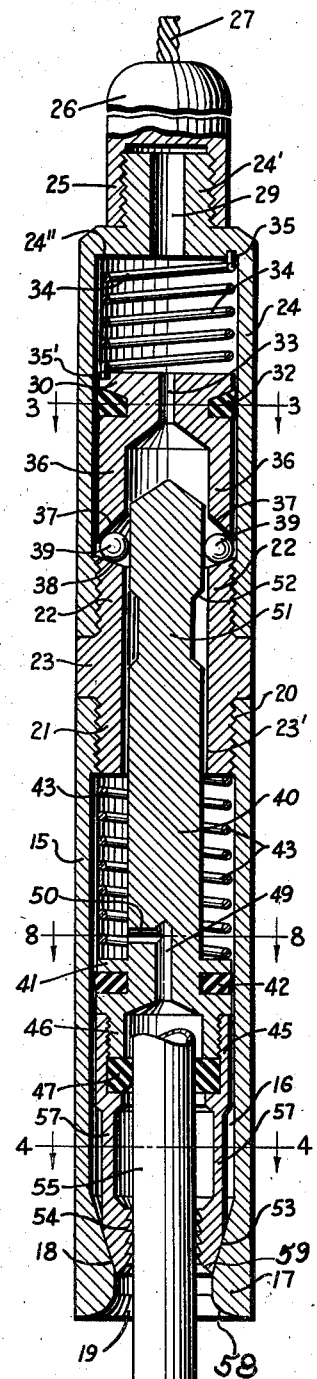

Inventor
John F. Bozeman
By Jack Athey
Attorney

Patented July 5, 1938

2,123,036

UNITED STATES PATENT OFFICE 2,123,036

RELEASABLE FISHING TOOL

John F. Bozeman, Houston, Tex., assignor of one-half to James L. Johnston, Houston, Tex.

Application September 26, 1936, Serial No. 102,653

11 Claims. (Cl. 294—102)

This invention relates to new and useful improvements in releasable fishing tools.

One object of the invention is to provide an improved releasable fishing tool for oil and gas wells and the like, said tool being adapted to be lowered into a well, either for placing articles therein or for withdrawing tubing, rods and other articles therefrom, and which may be released from said articles at will.

Another object of the invention is to provide a fishing tool adapted to be lowered into a well from the surface to engage or release an article in the well, and having means operable from the surface for releasing the tool from the article, whereby the tool is readily controlled from the surface for both the engaging and releasing operation.

A further object of the invention is to provide a fishing tool to be lowered into a well from the surface for engaging, recovering, and releasing articles within the well, and, when desired, the tool may be released or disengaged from the article by fluid pressure built up in the well, whereby the tool releases and may be withdrawn from the well free of the article and re-engaged and again released a number of times, at the will of the operator.

Another object of the invention is to provide a fishing tool to be lowered into a well from the surface for engaging, recovering, and releasing articles within the well and so arranged as to indicate to the operator at the surface, the reception of the article to be recovered by the fishing tool, whereby the operator is notified of such engagement of the article and may act accordingly.

Still another object of the invention is to provide a fishing tool to be lowered into a well from the surface for engaging, recovering and releasing articles within the well, so constructed that the locking of the clutch member in its released position may be accomplished, either by mechanical pressure or by fluid pressure.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a vertical sectional view of a fishing tool constructed in accordance with the invention and shown in a gripping position in engagement with an article to be removed from a well, and the fishing tool being attached to a wire cable line;

Figure 2 is a similar view showing the fishing tool in a releasing position;

Figure 3 is a horizontal cross-sectional view taken on the line 3—3 of Figure 1;

Figure 4 is a similar view taken on the line 4—4 of Figure 1;

Figure 5 is a horizontal cross-sectional view taken on the line 5—5 of Figure 2;

Figure 6 is a similar view taken on the line 6—6 of Figure 2;

Figure 7:
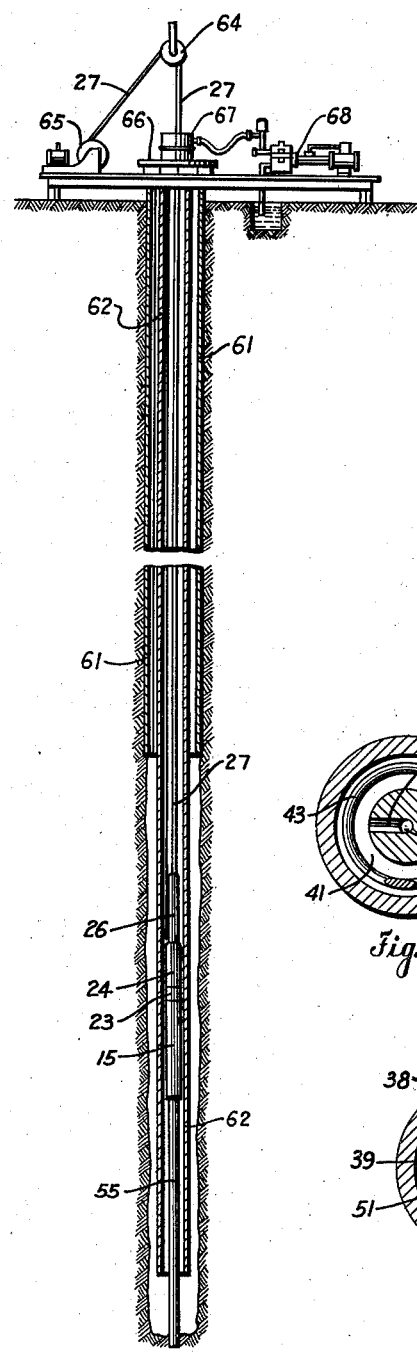
Figure 7 is a diagrammatic view of a well showing a fishing tool lowered therein and engaging an article in the well to be removed therefrom.
Figure 8:
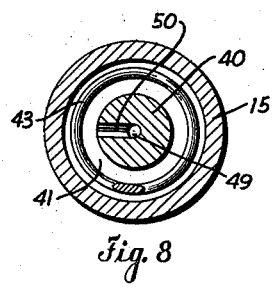
Figure 8 is a horizontal cross-sectional view taken on the line 8—8 of Figure 1.
Figure 11:
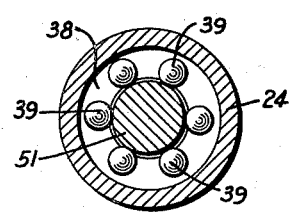
Figure 11 is a similar view taken on the line 11—11 of Figure 9.

In the drawings, the numeral 15 designates a lower main tubular member, the bore 16 of which is of a sufficient diameter to amply fit slidably over the article to be retrieved from the well. The lower end portion of the member is internally upset, as at 17, so as to form a beveled annular shoulder 18. An opening 19 is provided in the internally upset end portion of the member 15 for the entrance of an article to be removed from the well. The upper end portion of the tubular member 15 is internally screw-threaded, as at 20, for receiving the screw-threaded lower nipple portion 21 of a coupling element 23. The coupling 23 is provided with an upper nipple extension 22 which is externally screw-threaded for attaching to the lower end of an upper tubular member 24. The upper end of the member 24 is provided with an externally screw-threaded reduced extension 24' onto which may be screwed an ordinary socket member 25 of a sinker bar or weighted element 26, to which latter the lower end of a cable 27 is attached securely in any usual or approved manner, as shown in Figures 1 and 2, or said screw-threaded extension 24' may be attached to the lower end of a tubular drill stem or other tubing 28, as shown in Figure 9.

The extension 24' of said upper tubular member 24 is provided with an axial port 29 extending longitudinally therethrough and communicating with the interior of the member 24. When said extension 24' is connected to a tubular drill stem or other tubing 28 (see Figure 9), the port 29 registers with the bore of said drill stem or tube 28, whereby fluid may be pumped down through said stem and into the member 24, for a purpose to be described later.

A piston 30 is slidably fitted within the tubular member 24 so as to reciprocate therein. The piston is provided with an annular packing or sealing ring 32, which will seal off the space between the piston and the wall of the member 24. An axial port 33 extends longitudinally through the head of the piston and co-acts with the port 29 of the extension 24' of the tubular member 24 for fluid circulation, as will be herein later described. When the fishing tool is used on a wire line cable, as shown in Figures 1 and 2, a coiled spring 34 is provided in the upper end portion of the member 24 between the end shoulder wall 24'' thereof and the head of the piston 30, and as is shown, each end of the spring is outturned, so as to fit in recesses or pockets 35, 35', respectively in the end wall 24'' of the tubular member 24 and in the end of the piston, which prevents the rotation of the piston with respect to the fishing tool yet permits endwise movement of the piston.

Figure 9:
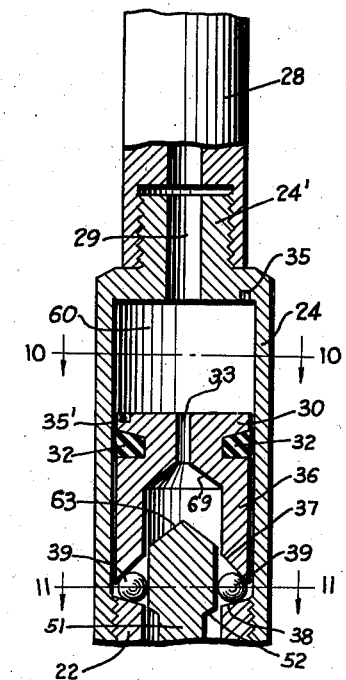
Figure 9 is a fragmentary vertical section of the upper portion of the fishing tool, illustrating the same attached to a drill stem or tubing.
Figure 10:
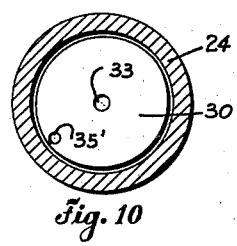
Figure 10 is a horizontal cross-sectional view taken on the line 10—10 of Figure 9.

A depending annular flange or skirt 36 is provided on the bottom of the piston, the lower end of which is beveled or inclined internally, as will be seen in Figures 1, 2, and 9, upwardly from its outer edge, as at 37. The upper nipple portion 22 of the coupling member 23 is inclined downwardly from its outer edge, as at 38. A plurality of balls 39, preferably of steel, are mounted between the inclined ends 37, 38, respectively, of the skirt 36 and nipple portion 22. The inclined edges of the parts 22 and 36 have a tendency to force the balls 39 inwardly around the stem 40 of a plunger member 41 which is slidable in the lower tubular member 15, said stem being extended through the bore 23' of the coupling member 23 and into the annular skirt portion 36 of the piston 30.

The plunger member 41 is provided with an annular packing or sealing ring 42 for closing the space between the plunger member and the tubular member 15, and interposed between the annularly shouldered portion of the plunger member and the end of the lower nipple portion 21 of the coupling member 23 is a coiled spring 43 which normally tends to move the plunger member downwardly in the lower tubular member 15 and yieldably holds a spring slip clutch member 44 to a seated gripping position in the tapered seat 18 within the lower end portion of the tubular member 15 as will be later more fully described.

As shown, the spring slip clutch member 44 comprises an annular upper portion 45 which is internally screw-threaded to fit on a correspondingly screw-threaded reduced lower end extension 46 of the plunger member 41, said portion 45 of the spring slip clutch member having an internal packing ring 47 of a suitable resilient compressible material that will effect a fluid-tight seal about the rod, tube or other article to be retrieved from the well. Above the packing ring 47, the plunger member 41 is provided with a recess 48, from which an axial bore 49 extends upward in the stem portion 40 of the plunger member and terminates in a lateral port 50 through which fluid flow communication is had with the space between the stem 40 and tubular member 15 and between the packing 42 and the lower end of the nipple portion 21 of the coupling member 23. In this connection it may be here noted that there is sufficient clearance space between the stem portion 40 of the plunger member 41 and the surrounding wall of the bore 23' of the coupling member 23 to permit flow of fluid therethrough from the port 33 in the head of the piston 30, there being sufficient space between the series of balls 39.

Near the upper end of the stem portion 40 of the plunger member 41 is a reduced neck 51 having a beveled annular upper shoulder 52 and a lower shoulder which may or may not be beveled, as desired, because the form of the lower shoulder has no particular function in the tool. However, the upper shoulder 52 is beveled to co-operate with the oppositely beveled shoulder 37 at the lower end of the skirt portion 36 of the piston 30 so as to engage the balls 39 to hold the plunger member retracted in the releasing condition of the tool as shown in Figure 2 of the drawings.

The normal condition of the tool is substantially that shown in Figure 1, which is also the condition of the tool in engaging relation to the article to be retrieved from the well. In other words, the spring slip clutch member 44 is pressed by the spring 43 into wedging relation in the tapered seating portion 18 at the lower end of the tabular member 15. This spring slip clutch 44 may be of any approved form and construction, but, as shown, it preferably has a tapered lower end portion 53 and is formed with a multiplicity of teeth or biting edges 54 internally thereof for gripping the article to be retrieved from the well, which, as shown in Figures 1 and 2 of the drawings, is a tube 55.

As shown, the spring slip clutch 44 is slitted longitudinally, as at 56 (see Figure 4), to provide a series of segmental tongues 57 which are inherently resilient and have a normally open set so as to permit relative longitudinal movement between the gripping portions of said spring slip clutch and the article or element to be retrieved in the well, but being sprung inwardly to grip said article or element when the tapered end portions 53 of the clutch are wedged in the seat portion 18 at the lower end of the tubular member 15.

In using the tool of the present invention, constructed and arranged as illustrated in Figures 1 and 2 of the drawings and as a fishing tool to engage and remove a rod, tube, or other article or element from a well, the tool attached to the wire line cable 27 and with its parts in normal relative positions as shown in Figure 1, is lowered or dropped into the well. As the mouth of the open lower end of the tubular member 15 is rounded, as at 58, and somewhat flared, and the mouth of the spring slip clutch 44 is also flared, as at 59, the engaged article or element in the well is guided through said mouths and into the spring slip clutch 44, the spring 43 yielding to permit relative longitudinal movement between the clutch and the tubular member 15 and reacting to press the clutch into the tapered seat 18 and thereby grip the tube 55 or other element to be retrieved, the engagement of the article or element by the spring slip clutch 44 being effected by the upward pull of the wire line cable 27.

In Figure 7 a well installation and use of the tool of the present invention is illustrated more or less conventionally, and it is to be understood that this is only one of many possible adaptations of the invention. In the illustration, the well casing is designated by the numeral 61. Depending in the casing 61 is an inner tube 62 extending down to near the bottom of the well and in the lower portion of which is a rod, tube, or other article 55 to be retrieved. The tool, indicated by the numerals of the parts 15, 23, 24, and 26, is shown suspended from the wire line cable 27 which is lowered in the well from the pulley 64 of a conventionally illustrated rigging of the usual hoisting apparatus 65 provided on the derrick (not shown), on the floor of which latter is the usual rotary table 66, a regular stuffing box 67 on the top of the tubing, or the casing, and the usual fluid pressure or "mud" pump 68.

Should the article or element to be retrieved stick in the well or for any other reason it be desired to release the fishing tool therefrom, the release is readily accomplished by "slacking off" or relieving the strain on the wire line cable 27, and tightening the packing in the stuffing box 64 around the wire line cable at the top of the tubing or casing, and introducing fluid pressure into the tubing or the casing of the well, which is supplied and controlled from the surface.

In practically all instances in the use of the tool of the present invention, the tool is lowered into the well on a wire line cable, such as 27, Figure 7, through a tubular casing or lining, or a tubular drill stem, or, in some cases, a special tube, the tubular body 15 and 24 of the tool will be of substantially the same or slightly less diameter than the interior diameter of the tubing. Therefore, if a fluid is pumped down from the surface through the tubing, after packing off at the surface of the well between the wire line 27 and the tubing or the casing of the well, the pressure on the sinker bar 26 and upper end of the tubular member 24 will force the tubular members 15 and 24 with their coupling member 23 downwardly and thereby compressing the spring 43 as the plunger member 41 is held by the engaged article or element 55 from moving downwardly with said tubular and coupling parts 15, 24, and 23, whereupon the neck portion 51 of the stem 40 of the plunger 41 is brought into the range of the balls 39. When this occurs, the normally compressed spring 34 expands and forces the piston 30 downwardly, so that the tapered end 37 of the skirt 36 of the piston wedges the balls about the neck portion 51 and under the upper beveled shoulder 52 of the stem 40 of the plunger 41, as shown in Figure 2. With the tool in this position, and by releasing the fluid pressure in the tubing or the casing and removing the stuffing box 64 from around the wire line cable 27, the tool may be withdrawn from the well free of the article or element with which the tool had been engaged, either for retrieving said article, or for setting or releasing an article in the well.

To re-engage the tool with the article or element in the well, the tool is re-set at the surface of the well for engagement, by partly unscrewing the coupling member 23 from the tubular member 24. This partially relieves the compression of the spring 34, so as to allow the piston 30 to be retracted to its original position, and the revolving of the coupling member 23 to again tighten it will have a tendency to throw or force the balls 39 back into their original position, shown in Figure 1, and the plunger is free to resume its normal position, Figure 1. The fishing tool now may be lowered or dropped back into engagement with the article or element in the well to be retrieved.

In some cases it is desirable to use tubing, drill stem, or a tubular rod 28, for applying the fishing tool of the present invention, in which event the tube is screwed onto the externally screw-threaded extension 24' of the upper tubular member 24, as in the modification shown in Figure 9 of the drawings. In this modification the tool may be lowered to engagement with the fish either by gravity, force supplied to the rigid stem, or by fluid pressure applied to the upper surface of the tubular member 24. In this modification, the spring 34 is eliminated and in lieu thereof, the piston 30 is operated by fluid pressure supplied through the tubing 28 and acting on the piston 30 in the chamber 60 of the upper tubular member, where the spring 34 is housed in the first herein described tool structure, shown in Figures 1 and 2. In the modification, the tool can be lowered into the well and engaged with the article or element to be retrieved with more positive operation and at the same time, the releasing operation is selectively fluid-controlled. By the use of the modified form of the tool structure and fluid-controlled release, together with the advantage of a more positive engaging operation and manipulation through the tubular rod or stem 28, the tool may be made to release and re-grip the article or element in the well any number of times, without removing said tool from the well and said tool being under convenient control from the surface of said well at all times.

While the tool is herein described more particularly as a fishing tool for recovering an article or element from a well, it is to be understood that, owing to its controllable releasability while in the well, as herein set forth, it is capable of convenient and practical use for lowering articles or elements, such as core drills, survey tubes, dynamite shots, and other removable devices into a well, either in drilling operations or for other purposes.

There is another important advantage beyond that of the fluid-controlled provision for releasing the tool, in that by the provision of the packings 32, 42, and 47, the fluid may be circulated from the tubular stem 28 through the port 29, chamber 60, port 33, around the plunger stem 40, the chamber in which the spring 43 is located, and out through the ports 50 and 49, into the tubular article or element 55, in cases where it is desired to wash through or lubricate some parts with fluid in connection with said article 55 below the fishing tool.

It is pointed out that when the fishing tool is operated on a tubular stem, and fluid circulation is maintained through the tubular stem and fishing tool, at the same time, the tool will engage over the upper end of the pipe or article 55 fished for. The article will pass up into the fishing tool, and strike the bottom of the plunger 41, forcing it upwardly, so that the externally beveled head 63 of the plunger will seat or engage in a conical seat 69, located in the under side of the piston 30. As will be noticed in Figure 9, this will close the port 33, so that circulation of fluid therethrough is prevented, and which in turn will stop the circulation of the fluid at the surface, thereby indicating to the operator that the article to be retrieved is inside of the fishing tool and ready to be removed from the well. To effect the latching of the plunger 40 in a raised position, the casing of the tool is then raised slightly until the balls 39 engage under the shoulder 52, pressure still being maintained upon piston 30. This will force the piston downwardly with the plunger 40 and the lower cam surface 37 will engage the balls, locking them securely under the shoulder 52. To re-set the tool the operator will then close the throttle on the pump 68, and will release the fluid pressure in the tubular stem 28 and on the piston 30, thus preventing said piston from holding the balls 39 inwardly, which is the release position, as shown in Figure 2. The spring 43 is now permitted to exert its energy to move the plunger 41, together with the spring slip clutch member 44, downwardly to its gripping position, and inasmuch as the article to be retrieved from the well is already engaged by the slip member 44 it is only necessary to hoist the fishing tool from the well. It is pointed out that with the spring slip member in the position shown in Figure 1, the article is securely gripped.

If the article should be stuck or for any other reason it would be necessary to release said article, the operator would apply the pump pressure through the stem 26 onto the piston 30, and lower said stem and fishing tool until the article raises the plunger 41 and the beveled head 63 engages in the conical seat 69, and stops the circulation of the fluid, as hereinbefore described. When this occurs, the balls 39 will be forced inwardly by the cam surface 37 and engage under the annular shoulder 52 and hold said plunger in the releasing position of the tool, as shown in Figure 2. The tool may now be removed from the well, and with the pressure from the pump 68 still being applied to the piston 30, said tool will remain in a releasing position, until said pressure is relieved by shutting off said pump 68. It is pointed out that the fishing tool may be removed from the well, or said pump pressure may be let off and the tool lowered until reengaged with the article, and the above described operation may be repeated. With this form of the invention it will be seen that it is not necessary to remove the fishing tool from the well to re-set said tool for engaging the article to be fished from the well.

Obviously, the structure may be modified further than herein shown and described, without departing from the spirit and scope of the invention, as defined in the appended claims. The invention, therefore, is not limited to the specific construction and arrangement herein shown.

What I claim and desire to secure by Letters Patent is:

1. A fishing tool including, a tubular body approximately of the same diameter as the inner diameter of the tubing of the well and having provision for attachment to a suspending element for lowering and hoisting it in a well, a yieldable clutch element normally positioned in said tubular body to grip and hold an article to be retrieved from the well, said tubular body of the tool being arranged to move downwardly relative to the clutch under the influence of a fluid pressure built up in the well above the tool to release the clutch from the article, and means in the body for latching the clutch in its releasing position.

2. A fishing tool including, a tubular body approximately of the same diameter as the inner diameter of the tubing of the well and having provision for attachment to a suspending element for lowering and hoisting it in a well, a yieldable clutch element normally positioned in said tubular body to grip and hold an article to be retrieved from the well, said tubular body of the tool being arranged to move downwardly relative to the clutch under the influence of a fluid presure built up in the well above the tool to release the clutch from the article, and pressure controlled means in the body for latching the clutch in its releasing position.

3. A fishing tool including, a tubular body having provision for attachment to a suspending element for lowering and hoisting it in a well, a yieldable clutch element normally positioned in said tubular body to grip and hold an article to be retrieved from the well, said tubular body being movable, by said suspending element in the well, downwardly with relation to the clutch element therein, thereby actuating the release of the clutch from the article in the well to be retrieved, and pressure control means for holding said clutch in released position.

4. A fishing tool including, a tubular body having provision for attachment to a suspending element for lowering and hoisting it in a well, a yieldable clutch element normally positioned in said tubular body to grip and hold an article to be retrieved from the well, said tubular body being movable, by fluid pressure in the well, downwardly with relation to the clutch element therein, thereby actuating the release of the clutch from the article in the well to be retrieved, and fluid pressure control means for holding said clutch in released position.

5. A fishing tool including, a tubular body having provision for attachment to a suspending element for lowering and hoisting it in a well, a yieldable clutch element normally positioned in said tubular body to grip and hold an article to be retrieved from the well, said tubular body being movable, by fluid pressure in the well, downwardly with relation to the clutch element therein, thereby effecting the release of the clutch from the article in the well to be retrieved, and pressure controlled piston means for holding said clutch element in released position in relation to said tubular body.

6. A fishing tool including, a tubular body having provision for attachment to a suspending element for lowering and hoisting it in a well, a yieldable clutch element normally positioned in said tubular body to grip and hold an article to be retrieved from the well, said tubular body having a fluid flow passageway therethrough and being movable by the suspending element downwardly with relation to the clutch element therein, thereby effecting the release of the clutch from the article in the well to be retrieved, and pressure controlled piston means in said passageway for holding said clutch element in released position in relation to said tubular body.

7. A fishing tool including, a tubular body having provision for attachment to a suspending element for lowering and hoisting it in a well, a yieldable clutch element normally positioned in said tubular body to grip and hold an article to be retrieved from the well, said tubular body having a fluid flow passageway therethrough and being movable by fluid pressure in the well downwardly with relation to the clutch element therein, thereby effecting the release of the clutch from the article in the well to be retrieved, and pressure controlled piston means in said passageway for holding said clutch element in released position in relation to said tubular body.

8. In a fishing tool, a tubular body adapted to receive an article to be retrieved from or placed within a well, said tubular body having provision for the attachment of a suspending element for lowering and hoisting it in the well, a plunger normally urged downwardly but yieldable upwardly in said tubular body, a spring slip clutch on the lower end of said plunger, said clutch and the tubular body having co-operative engaging seat portions, whereby the clutch is closed inwardly and held gripped about the article received in said tubular body, said plunger having a stem extension formed with a neck providing a shoulder with a head thereabove, a piston in the upper part of said tubular body, said piston having a skirt surrounding the head of said stem extension of the plunger, the end of the skirt being beveled oppositely to the shoulder of the stem extension, said tubular member having an internal annular shoulder surrounding said stem extension in opposed relation to the end of the skirt of said piston, said annular shoulder being beveled oppositely to the bevel of the skirt, and a series of balls surrounding said stem extension and interposed between the end of the skirt of said piston and the opposed internal annular shoulder of the tubular body.

9. A fishing tool including in combination with the well tubing, a tubular body approximately of the same diameter as the inner diameter of the well tubing and adapted to receive an article to be retrieved from or placed within a well, a gripping means in said tubular body, a suspending element attached to the upper end of said tubular body for lowering and hoisting the tool in the well, and removable sealing means at the upper end of the well to form a fluid-tight seal around the suspending element, whereby fluid pressure may be supplied to the well between said sealing means and the tool to force the tool downwardly and release the gripping means.

10. In a fishing tool, a tubular body having its lower end open and flared to receive an article to be retrieved from or placed within a well, a plunger in said tubular body, a spring normally urging said plunger downward in said tubular body, a spring slip clutch on the lower end of said plunger, said clutch having a tapered lower end, said tubular body having a tapered seat to receive the end portion of the downwardly urged clutch, whereby the clutch is wedged inwardly and held gripped about the article received in said tubular body, said plunger having a stem formed with a reduced neck portion, a piston in the upper part of said tubular body and having a skirt surrounding the upper portion of said stem of said plunger, the lower end of the skirt being beveled, said tubular body having an internal shoulder surrounding the stem of the plunger and longitudinally opposed to said piston, said shoulder being beveled oppositely to the bevel of the end of the skirt of the piston, a series of balls surrounding the stem of the plunger and interposed between the opposed piston and shoulder of the tubular body, and a spring normally urging said piston toward said opposed shoulder of said tubular body.

11. A fishing tool including, a tubular body having its lower end open and flared to receive an article to be retrieved from or placed within a well, a plunger in said tubular body, a spring normally urging said plunger downward in said tubular body, a spring slip clutch on the lower end of said plunger, said clutch having a tapered lower end, said tubular body having a tapered seat to receive the tapered lower end of the downwardly urged clutch, whereby the clutch is wedged inwardly and held gripped about the article received in said tubular body to be retrieved, said plunger having a stem formed with a reduced neck, a piston in the upper part of said tubular body and having a skirt surrounding the upper portion of said stem of said plunger, the lower end of the skirt being beveled, said tubular body having an internal shoulder surrounding the stem of the plunger and longitudinally opposed to said piston, said shoulder being beveled oppositely to the bevel of the end of the skirt of the piston, a series of balls surrounding the stem of the plunger and interposed between the opposed piston and shoulder of the tubular body, and means whereby fluid pressure may be used to actuate the piston and force the same toward opposed shoulder of said tubular body.

JOHN F. BOZEMAN.